United States Patent [19]

Columberg

[11] 4,085,070
[45] Apr. 18, 1978

[54] PROCESS FOR THE PREPARATION OF AN OLEFIN-POLYMERIZATION CATALYST

[75] Inventor: Alfred Columberg, Geneva, Switzerland

[73] Assignee: Battelle Memorial Institute, Geneva, Switzerland

[21] Appl. No.: 697,679

[22] Filed: Jun. 18, 1976

[30] Foreign Application Priority Data

Jun. 20, 1975 Switzerland ............... 008050/75
Feb. 27, 1976 Switzerland ............... 002415/76
Feb. 27, 1976 Switzerland ............... 002416/76

[51] Int. Cl.² ........................... C08F 4/58; C08F 4/52
[52] U.S. Cl. ........................... 252/429 R; 252/431 C; 526/185; 526/187
[58] Field of Search ................... 252/429 R, 431 C

[56] References Cited

U.S. PATENT DOCUMENTS 3,737,419  6/1973  Hsieh ............... 252/431 C X
3,769,363  10/1973  Brennan ............ 252/429 R X Primary Examiner—Patrick P. Garvin
Attorney, Agent, or Firm—Karl F. Ross

[57] ABSTRACT

An olefin-polymerization catalyst is prepared by reacting at least one compound of an element selected from the group consisting of the elements of groups Ia, IIa, IIb, IIIa, IVa, Va and VIa of the Periodic Table of elements with at least one reactive acyl compound to provide a solid reaction product. This is dissolved or dispersed in an anhydrous non-polar organic solvent and contacted with at least one organometallic compound of a metal selected from the group consisting of elements of groups Ia, IIa, IIb, IIIa and IVa of the Periodic Table of elements and the mixture is used in an olefin polymerization reaction. The catalyst contains no transition elements.

10 Claims, 1 Drawing Figure

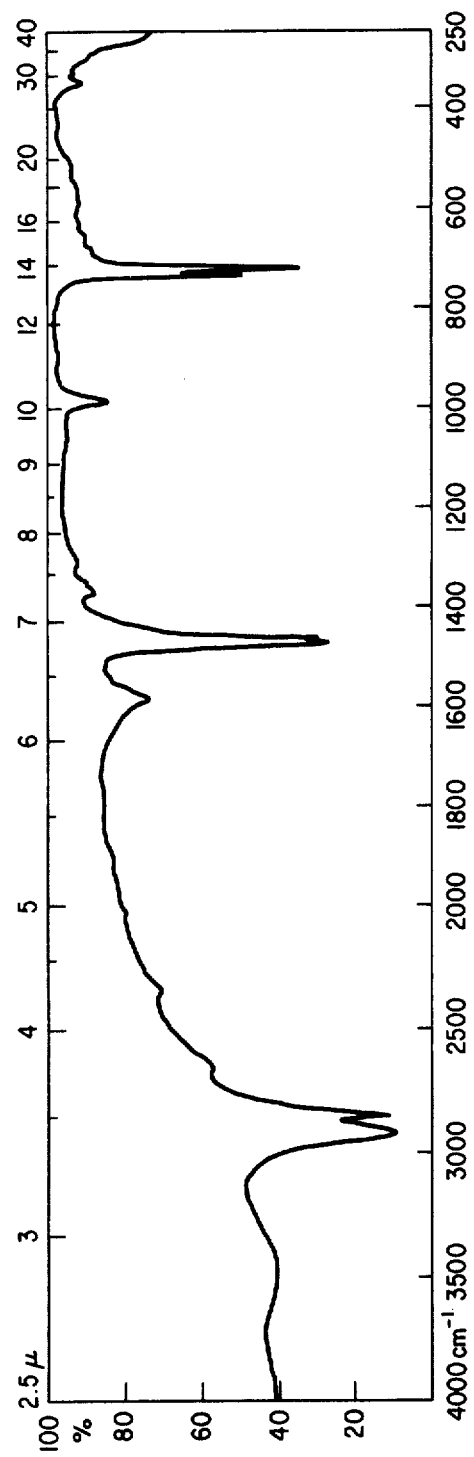

PROCESS FOR THE PREPARATION OF AN OLEFIN-POLYMERIZATION CATALYST

This invention relates to a process for preparing an olefin-polymerisation catalyst, the catalyst obtained in such a process and the use of this catalyst in polyolefin preparation. This use is particularly applicable to the preparation of polyethylene having a high melting point by low-pressure polymerization of ethylene, that is to say polymerization under a pressure of the order of several atmospheres. In particular, the invention relates to a process for the preparation of a catalyst containing no transition elements.

Up to the present time, low-pressure polymerization of olefins has been carried out using catalysts containing transition element compounds. The "Ziegler catalysts," which form a particularly important group of such catalysts, consist of a mixture of at least one organometallic compound of a metal from one of the groups Ia, IIa, IIb, IIIa and IVa of the Periodic Table of elements, particularly aluminum and boron, and at least one compound of a transition metal of groups IVb, Vb and VIb of the Periodic Table.

The references herein to the Periodic Table of the elements refer particularly to the form shown in, for example, the Handbook of Chemistry and Physics, 52nd edition (1971-1972), the Chemical Rubber Company, Cleveland, Ohio, U.S.A.

These catalysts have the disadvantage of having to contain large quantities of transition element compounds in order to possess sufficient catalytic activity for industrial requirements. The use of these catalysts results in strong coloration of the prepared polymers, requiring the polymers to be purified until they contain no further catalyst traces. This purification is an additional operation, which increases the selling price of the product.

The object of the invention is to eliminate the aforementioned disadvantage. To this end, there is provided a process for the preparation of an olefin-polymerisation catalyst, in which at least one compound of an element of group Ia, IIa, IIIa, IVa, Va or VIa of the Periodic Table of the elements is reacted with at least one reactive acyl compound wherby a solid reaction product is obtained which is finely dispersable or soluble in an inert, anhydrous, non-polar organic solvent.

The compound of the element of group Ia, IIa, IIIa, IVa, Va or VIa of the Periodic Table of the elements is preferably a halide, oxyhalide, acetate or acetylacetonate. Halides and oxyhalides are particularly important for elements of groups II to VI while acetates are convenient for elements of groups I to IV. Acetylacetonates of group IIa are particularly important. For example, one or more of the following compounds can be used; $CH_3COONa$; $CH_3COOK$; $Mg(C_5H_7O_2)_2$ (magnesium acetylacetonate); $Ca(CH_3COO)_2$; $Ba(CH_3COO)_2$; $Mg(CH_3COO)_2$; $CH_3COOLi$; $Sr(CH_3COO)_2$; $Tl(CH_3COO)_3$; $CaCl_2$; $InCl_3$; $Al(CH_3COO)_3$; $SiCl_4$; $POCl_3$; $SeCl_4$; $Si(CH_3COO)_4$; $Ge(CH_3COO)_4$; $SnCl_4$; $Sn(CH_3COO)_4$; $SbCl_3$; $AsCl_3$; $BiCl_3$; $TeCl_4$ and $PCl_5$.

The active acyl compound used is preferably an aliphatic carboxylic acid or anhydride or a halo-aliphatic carboxylic acid or anhydride. In particular may be mentioned acetic acid and acetic anhydride, and fluoroacetic acid and chloroacetic acid and their anhydrides. It is particularly advantageous to use a mixture of at least acid and at least one anhydride, preferably the anhydride of the acid selected, for example a mixture of acetic acid and acetic anhydride.

In the case where the compound of an element group Ia, IIa, IIIa, IVa, Va or VIa is a halide or oxyhalide, such as a chloride or oxychloride, it is preferable to use as the acyl compound an aliphatic acid or a mixture of acids.

The reaction is preferably effected at a temperature between 70° and 100° C, for a time of 10 to 30 hours.

The process according to the invention is thus based on the heat treatment of the compound of an element from group Ia, IIa, IIIa, IVa, Va or VIa of the Periodic Table of the elements in the presence of at least one acyl compound such as acetic acid or acetic anhydride at a well defined temperature (between 70° and 100° C). The mechanism of the physicochemical processess occurring during the heat treatment are not yet known. However, an important increase in the ability of the treated compound to disperse or dissolve in an inert non-polar organic solvent is observed. Anhydrous benzene is a particularly important solvent in this regard. Thus, while, for example, sodium acetate, magnesium acetate, aluminum chloride and aluminum acetate are practically insoluble in anhydrous benzene if they are not subjected to the thermal treatment described above, they disperse easily in this solvent after having been subjected to the treatment, the dispersion being in the form of a suspension of solid material in a colorless liquid. It is very easy to render this suspension homogeneous by simple moderate agitation. In the case where the compound treated is a salt other than an acetate, for example a chloride, the latter compound is, at least in a transitory phase of the process, transformed into a corresponding anhydrous acetate.

On the other hand, even though the catalyst obtained according to the process of the present invention does not contain a transition element, its catalytic activity is at least of the same order as that of transition element compounds in Ziegler catalysts.

The value of this catalytic activity is given by the ratio of the weight (expressed in grams) of solid polyolefin (i.e. excluding the low molecular weight polyolefins obtained in the liquid state) obtained by olefin polymerization in the presence of the catalyst, to the product of the weight (expressed in grams) of the element of group Ia, IIa, IIIa, IVa, Va or VIa used in the catalyst and the duration of polymerization (in hours) as follows:

$$\text{Catalytic activity} = \frac{\text{Weight of solid polyolefin (grams)}}{\text{Duration of polymerization (hours)} - \text{weight of element of groups Ia-VIa (grams)}}$$

Where magnesium acetate is used for preparing an ethylene-polymerization catalyst, the catalytic activity is, for example, of the order of 900 for a given volume of anhydrous benzene in the enclosure in which the polymerization is effected by the process according to the present invention, and of the order of 0.2 for a "Ziegler catalyst" based on chromium acetate and diethyl aluminum chloride. Consequently, the heat treatment of the compound of the element of group IVa, Va or VIa according to the present invention results in the "modification" or "activation" of the compound in such a manner that it acquires a catalytic activity to the reaction of olefin polymerization, in combination with an organometallic compound such as a compound of the aluminum alkyl or aluminum alkyl halide type, which is superior to that of transition element compounds included in the composition of a Ziegler catalyst. This result is completely unexpected, taking into consideration the fact that, as indicated above, Ziegler catalysts necessarily require an important proportion of at least one transition element compound, and in view of the fact that it is well known that suppression of the latter compound is attended by the complete disappearance catalytic activity.

The present invention thus has an importance in both industrial applications and theoretical considerations which will not escape the specialists in the art.

According to a further feature of the present invention there is provided a process for the production of a polyolefin by polymerization or copolymerization of an olefin, in which the product of the process described above is dispersed and/or dissolved in an anhydrous non-polar organic solvent to form an apparently homogeneous liquid, this liquid is brought into contact with an organometallic compound of a metal of group Ia, IIa, IIb, IIIa, or IVa of the Periodic Table of the elements to form a solution or a dispersion which is then contactd with the olefin under a pressure and for a time sufficient to effect polymerization of the olefin.

The dispersion and/or solution of the first reaction product is preferably effected in two successive operations, of which the first consists of dispersing and/or dissolving the solid material in a relatively small volume of a first solvent, and the second operation consists of introducing a part of this first liquid so obtained into a relatively large volume of a second solvent, identical to the first solvent or miscible therwith, the amount of the first liquid added to the second solvent being such that the final liquid obtained is transparent or translucent.

The organometallic compounds of a metal belonging to group Ia, IIa, IIb, IIIa, or IVa of the periodic table of elements is preferably an aluminum organometallic compound of the general formula $Al_n R y X_{(n-y)}$, in which R represents an alkyl group and X represents a halogen atom, $n$ is 1 or 2, and $y$ is an integer from 1 to 3 when $n$ equals 1 or $y$ equals 1, 3 or 5 when $n$ equals 2. A particularly preferred compound is diethyl aluminum chloride $Al(C_2H_5)_2Cl$.

The following Examples illustrate the invention further

EXAMPLE 1

In a thoroughly dry 500 ml glass flask provided with a reflux column and 3 grinding balls, 4.28 g pure magnesium acetate (containing no transition elements) and having a composition represented by the formula $Mg(CH_3COO)_2.4H_2O$, at ambient temperature and under an atmosphere of dry hydrogen at a pressure slightly above 1 kg/cm². Pure anhydrous acetic acid (70 ml) and pure anhydrous acetic anhydride (70 ml) were then added. The contents of the flask were brought to 90° C in 1 hour while rotating the flask uniformly and continuously at about 60 revs/min and then maintained at 90° C during 20 hours under a nitrogen atmosphere and with continued rotation, the interior of the flask being protected from the entry of air by a mercury trap. The acetic acid and acetic anhydride were then evaporated under reduced pressure (about 30 mm Hg and finally 1 mm Hg). A white solid residue was obtained, which was dried by heating under a nitrogen atmosphere for 72 hours at a temperature rising progressively from 90° to 120° C, the nitrogen atmosphere being in contact with sufficient phosphorus pentoxide $P_2O_5$ for the latter to remain white at the end of the treatment.

The white residue was dispersed in 1 liter of anhydrous pure benzene (absolute benzene) to obtain an opalescent suspension in a colourless liquid.

Analysis of the suspension (liquid plus solid) indicated a magnesium content of 607 mg per liter.

An olefin polymerization reaction was then carried out in a glass autoclave having a volume of 1 liter and fitted with a rotary mechanical stirrer and capable of supporting an internal pressure of up to 16 atmospheres. The interior of the autoclave was dried at 95° C under vacuum (10 mm Hg) for 24 hours and then purged with a current of anhydrous ethylene under atmospheric pressure. Into this autoclave was introduced pure anhydrous benzene (500 ml) and then 150 ml of the suspension prepared and described above, which corresponds to a magnesium content of 91 milligrams (3.75 millimoles). The addition was accompanied by agitation of the liquid medium at 600 to 1,000 revs/min. A slightly turbid milky liquid was obtained in which it was not possible to discern the presence of a solid phase. Under continued agitation diethyl aluminum chloride $Al(C_2H_5)_2Cl$ (2.472 milliliters, 16 millimoles) was added. The molar ratio of diethyl aluminum chloride to magnesium was 4.27. The liquid obtained was still slightly turbid and milky. An ethylene pressure of 10 kg/cm² was then provided in the autoclave while the liquid medium was continuously agitated. The temperature of the medium was 70° C. After 1 minute a whitish cloud began to appear in the liquid and after 1 hour the autoclave contained a solid white precipitate and an excess of the liquid medium. The precipitate was dried by heating under reduced pressure to give a total yield of 80 g corresponding to a "catalytic activity" of 880. The precipitate was identified as being polyethylene by infra-red spectrography and was shown to contain no methyl groups. The percentage of crystallinity of the polyethylene, calculated by the method of H. Hendus and G. Schnell (Kunstoffe 51; p. 69, 1961), according to which an X-ray diffraction diagram of the product is used, was 70%. (The method used a Philips diffractometer fitted with a graphite monochromatic source and a proportional counter; radiation Cu-K alpha; 30 mA; 40 kV; rate of sweep: ¼° per minute; duration of sweep 5 minutes).

EXAMPLES 2 to 9

Catalysts were prepared in a manner analogous to that of Example 1 and were used to catalyse the polymerization of ethylene in the same way as in Example 1. The operating conditions and results are shown in Table 1.

TABLE NO. 1

| Example No. | 2 | 3 | 4 | 5 | 6 | 7 | 8 | 9 |
|---|---|---|---|---|---|---|---|---|
| Capacity of polymerization container (autoclave) (cm³) | 250 | 500 | 500 | 500 | 500 | 250 | 1000 | 500 |
| Nature of treat- | $CH_3COONa$ | $CH_3COOK$ | $Mg(C_3H_7O_2)_2$ | $Ca(CH_3COO)_2$ | $Ca(CH_3COO)_2$ | $Ba(CH_3COO)_2$ | $Be Cl_2$ | $CH_3COOLi$ |

TABLE NO. 1-continued

| Example No. | 2 | 3 | 4 | 5 | 6 | 7 | 8 | 9 |
|---|---|---|---|---|---|---|---|---|
| ed compound (original state) Group of the Periodic Table | Ia | Ia | IIa | IIa | IIa | IIa | IIa | Ia |
| Polymerization conditions |  |  |  |  |  |  |  |  |
| Volume of solvent (anhydrous benzene) in the polymerization container (cm³) | 100 | 100 | 200 | 200 | 200 | 100 | 300 | 200 |
| Quantity of metallic element (mg) | 37.5 | 140 | 24.3 | 285 | 96 | 50 | 100 | 20 |
| Quantity of organometallic compound (diethyl aluminium chloride) (millimoles) | 10 | 10 | 8 | 15 | 10 | 20 | 15 | 8 |
| Temperature (° C) | 25 | 25 | 20 | 20 | 70 | 20 | 25 | 25 |
| Pressure (kg/cm²) | 10 | 10 | 10 | 10 | 10 | 10 | 10 | 10 |
| Duration (hours) | 1 | 2 | 4 | 10 | 10 | 20 | 10 | 10 |
| weight of solid polyethylene (g) | 0.5 | 3.5 | 1.6 | 2.8 | 11.5 | 1.0 | 5.1 | 6.8 |
| Catalytic activity | 13 | 14.6 | 16.5 | 1 | 24 | 1 | 5.1 | 34 |

EXAMPLE 10

A catalyst was prepared in a manner analogous to that of Example 1 and was used to catalyse the polymerization of propylene in a manner similar to that described in Example 1, using the following operating conditions and with the following results:

Autoclave capacity: 250 cc

Nature of compound treated (in initial state): Mg $(CH_3COO)_2.4H_2O$ Group of the Periodic Table to which the metallic element of the compound treated belongs: IIa Polymerization conditions:

Volume of solvent (anhydrous benzene) in the autoclave: 100 cc

Quantity of the compound treated (magnesium acetate): corresponding to 91 mg of elemental magnesium Quantity of organometallic compound (diethyl aluminum chloride $Al(C_2H_5)_2Cl$: 20 millimoles Polymerisation temperature: 20° to 30° C Propylene pressure: 6 to 10 atmospheres Polymerization duration: 1 hour Weight of solid polypropylene obtained: 5.45 g Catalytic activity:

$$\frac{\text{Weight of solid polypropylene (in grams)}}{\text{Duration of polymerization (in hours)} \times \text{quantity of magnesium (in grams)}} = 60$$

EXAMPLE 11

8 grams of aluminum acetate (pure - containing no transition element) having a composition represented by the formula $Al_2O(CH_3COO)_4.4H_2O$ were introduced into a 1 liter glass flask, thoroughly dried and fitted with a reflux column and two grinding balls. From X-ray diffraction analysis of the starting material (Philips diffractometer fitted with a graphite monochromatic source and a proportional counter; radiation Cu-K alpha; 30 mA; 40 kV) it can be said that the product comprised a mixture of acetate of the formula $Al_2O(CH_3COO)_4.H_2O$ and at least one other unidentifiable compound of which the most intense diffraction angle corresponded to a parameter d = 8.49 A. Anhydrous pure acetic acid (100 ml) and anhydrous pure acetic anhydride (100 ml) were also introduced into the flask and the contents were then heated to 90° C in 1 hour while continuously rotating the contents at about 60 revs/min. The contents were held at 90° for 20 hours under a nitrogen atmosphere and with continuous rotation, the interior of the flask being protected from the entry of air by means of a mercury trap.

The acetic acid and acetic anhydride were then evaporated under reduced pressure (first 30 mm Hg and finally 1 mm Hg). A solid white residue was obtained which was dried by heating under an atmosphere of nitrogen for 72 hours at a temperature rising progressively from 90° to 120° C the nitrogen being dried by a sufficient quantity of $P_2O_5$ to remain white at the end of the treatment.

The solid dry white residue obtained was dispersed in 1 liter of pure anhydrous benzene (benzene absolute) to obtain an opalscent suspension in a colorless liquid.

Analysis of the suspension (liquid plus solid) indicates a content of 812 mg aluminum per liter. Analysis of the solid fraction of the suspension by X-ray diffraction (Philips diffractometer as described above) indicates that this fraction is essentially constituted by a mixture of the two following compounds: $Al(OH)(CH_3COO)_2$ and $Al(CH_3COO)_3$.

50 ml of pure anhydrous benzene were introduced into a glass autoclave of 1 liter, previously dried at 90° C under vacuum (1 mm Hg) for 10 hours. The autoclave was first purged with a current of dry nitrogen under atmospheric pressure. 150 ml of the suspension prepared as described above was then introduced, corresponding to 122 mg of aluminum (4.5 millimoles) while maintaining the liquid medium at a rotation of 600 revs/min. A slightly cloudy and milky liquid was obtained in which it was not possible to discern the presence of a solid phase. Into this liquid, under constant agitation, 3.09 ml (20 millimoles) of diethyl aluminum chloride $Al(C_2H_5)_2Cl$ were introduced. The molecular ratio of diethyl aluminum chloride to aluminum was 4.45.

The liquid obtained was still slightly cloudy and milky. The nitrogen atmosphere was then replaced by dry ethylene at a pressure of 10 kg/cm² under continued agitation. The temperature of the medium was about 20° C. After 1 minute a whitish cloud began to appear in the liquid and after 1 hour the autoclave contained a solid white precipitate and an excess of the liquid phase. The precipitate was dried by heating under reduced pressure to give a total yield of 21.5 g corresponding to a "catalytic activity" of 176.23.

By infra-red spectrography the precipitate was shown to be polyethylene containing no methyl groups (see the spectrum in the attached figure).

The percentage of crystallinity of the polyethylene was 73%.

By dynamic thermogravimetric analysis under an atmosphere of air it is seen that the product remains substantially undecomposed below about 430° C. Melting point (measured by differential thermal analysis): between 138° and 124° C.

EXAMPLES 12 to 19

In a manner similar to that described in Example 11 catalysts were prepared using different compounds of elements belonging to group IIIa of the periodic table and these catalysts were used in the polymerization of ethylene in a manner similar to that described in Example 11 under conditions indicated in Table 2.

In Example 17, the organometallic compound used was ethyl aluminum sesquichloride $Al_2(C_2H_5)_3Cl_3$.

EXAMPLE 20

2.2 grams of silicon tetrachloride $SiCl_4$ (pure, containing no transition element) were introduced into a 500 ml glass flask, thoroughly dried and fitted with a reflux condenser and two grinding balls, at ambient temperature and under an atmosphere of anhydrous nitrogen at a pressure slightly above 1 kg/cm².

50 ml of pure anhydrous acetic acid were also added. The contents of the flask were heated to 90° C in 1 hour while being subjected to uniform and continuous rotation at about 60 revs/min. The contents were maintained at 90° C for 20 hours, maintaining a nitrogen atmosphere and continuous rotation. The interior of the flask is protected from the entry of air by a mercury trap. The acetic acid was then evaporated under reduced pressure (at first 30 mm Hg and finally 1 mm Hg). A solid white residue was obtained which was dried by heating under nitrogen atmosphere for 32 hours at a temperature rising progressively from 90° to 120° C, the nitrogen atmosphere being in contact with sufficient $P_2O_5$ for the latter to remain white throughout the treatment.

The solid white residue obtained was dispersed in 1 liter of pure anhydrous benzene (absolute benzene). An opalscent suspension was obtained in a colorless liquid. Analysis of the suspension (liquid plus solid) indicates that the silicon content is 187 mg per liter.

A 1 liter glass autoclave was dried at 95° C under vacuum (10 mm Hg) for 24 hours and purged with a current of anhydrous ethylene under atmospheric pressure. The autoclave was fitted with a mechanical rotary

TABLE NO. 2

| Example No. | 12 | 13 | 14 | 15 | 16 | 17 | 18 | 19 |
|---|---|---|---|---|---|---|---|---|
| Capacity of polymerization container (autoclave) (cm³) | 500 | 500 | 500 | 500 | 500 | 500 | 500 | 500 |
| Nature of compound of element of group IIIa | $Al(CH_3COO)_3 + Al(OH)(CH_3COO)_2$ | | | | | | $Al(C_5H_7O_2)_3$ | $Tl(CH_3COO)_3$ |
| Polymerisation conditions | | | | | | | | |
| Volume of solvent (anhydrous benzene) in the polymerization container (cm³) | 200 | 200 | 200 | 200 | 200 | 200 | 200 | 200 |
| Quantity of element of group IIIa (mg) | 160 | 122 | 122 | 122 | 122 | 122 | 60 | 5 |
| Quantity of organometallic compound (millimoles) | 20 | 20 | 20 | 20 | 20 | 20 | 8 | 8 |
| Temperature (° C) | 14 | 30 | 50 | 70 | 90 | 20 | 25 | 25 |
| Pressure (kg/cm²) | 10 | 10 | 10 | 10 | 10 | 10 | 10 | 10 |
| Duration (hours) | 1 | 1 | 1 | 1 | 1 | 1 | 4 | 10 |
| Weight of solid polyethylene (g) | 24.5 | 13.5 | 0.5 | 0.25 | 0.1 | 1.5 | 11.5 | 0.6 |
| Catalytic activity | 153.1 | 110.8 | 4.1 | 2.0 | 0.8 | 94.4 | 6.3 | 120 |

Comparison of the results of Examples 11 to 16 shows that the highest catalytic activity was obtained when polymerizing ethylene at 20° C, and that an elevation of the temperature of polymerization in the temperature range between 30° to 90° C results in a marked diminution of the catalytic activity. The behavior of the catalyst according to the present invention thus differs radically from that of Ziegler catalysts, of which the catalytic activity increases with the temperature, at least in the temperature range of up to 250° C (French Pat. No. 1,235,303).

Comparison of the results of Examples 11 and 17 shows that the activity of a catalyst prepared using diethyl aluminum chloride is superior under the polymerization conditions specified in the Examples to that of a catalyst prepared using ethyl aluminum sesquichloride.

agitator and designed to stand an internal pressure of up to 16 atmospheres. Into this autoclave were introduced 50 ml of pure anhydrous benzene.

150 ml of the suspension obtained as described above were added, corresponding to 28 mg of silicon (1 millimole) while continuously agitating the liquid medium at 600 to 1,000 revs/min. A slightly cloudy and milky liquid was obtained in which it was not possible to discern the presence of a solid phase. Into this liquid, under constant agitation, 1.236 ml (8 millimoles) of diethyl aluminum chloride $Al(C_2H_5)_2Cl$ were added. The molar ratio of diethyl aluminum chloride to silicon was 8. The resulting solid was still slightly cloudy and milky.

The nitrogen atmosphere was then replaced by dry ethylene at a pressure of 10 kg/cm² while agitation of the liquid medium was continued. The temperature of the medium was 70° C. At the end of one minute a whitish cloud began to appear in the liquid and at the end of 1 hour the autoclave contained a solid white precipitate and an excess of liquid phase. The precipitate was dried by heating under reduced pressure to give a yield of 0.14 g, corresponding to a "catalytic activity" of 0.5.

Infra-red spectrography shows the precipitate to be polyethylene containing no methyl groups.

EXAMPLES 21 to 28

Catalysts were prepared in a manner similar to that described in Example 20 using different compounds of elements belonging to groups IVa and VIa of the periodic table. The catalysts were used to catalyse the polymerization of ethylene in the same way as in Example 20, but the operating conditions and the results are shown in Table 3.

TABLE NO. 3

| Example No. | 21 | 22 | 23 | 24 | 25 | 26 | 27 | 28 |
|---|---|---|---|---|---|---|---|---|
| Capacity of polymerization container (autoclave) (cm$^3$) | 250 | 500 | 250 | | 500 | 1000 | 500 | 500 |
| Nature of compound of element of group IVa, Va or VIa | SiCl$_4$ | POCl$_3$ | SeCl$_4$ | GeCl$_4$ | SnCl$_4$ | Pb(CH$_3$COO)$_2$ | BiCl$_4$ | TeCl$_4$ |
| Group of the Periodic Table | IVa | Va | VIa | IVa | IVa | IVa | IVa | VIa |
| Polymerization conditions | | | | | | | | |
| Volume of solvent (anhydrous benzene) in the polymerization container (cm$^3$) | 100 | 100 | 100 | 200 | 200 | 325 | 200 | 200 |
| Quantity of element of group IVa, Va or VIa (mg) | 56 | 0.93 | 0.4 | 0.3 | 100 | 310 | 104 | 50 |
| Quantity of organometallic compound (diethyl aluminum chloride) (millimoles) | 16 | 8 | 8 | 8 | 15 | 15 | 15 | 15 |
| Temperature (° C) | 20–70 | 20 | 25 | 20 | 25 | 25 | 25 | 25 |
| Pressure (kg/cm$^2$) | 10 | 10 | 10 | 10 | 10 | 10 | 10 | 10 |
| Duration (hours) | 20 | 1 | 2 | 20 | 10 | 20 | 10 | 20 |
| Weight of solid polyethylene (g) | 2 | 0.6 | 1 | 0.25 | 5.1 | traces | 0.5 | traces |
| Catalytic activity | 2 | 722 | 1190 | 30.0 | 5.1 | | 0.05 | |

I claim:

1. A process for preparing an olefin-polymerization catalyst which comprises reacting at least one acetate of an element of Group Ia, IIa or IIIa of the Periodic Table with at least one acyl group from an aliphatic carboxylic acid or an aliphatic carboxylic anhydride, heating the reaction mixture thus obtaining to a temperature of 70° to 100° C for a period of 10 to 30 hours, and eliminating excess acyl compound to produce a solid residue finely dispersable or soluble in an inert, anhydrous nonpolar organic solvent.

2. The process defined in claim 1 wherein the acyl group is acetyl.

3. The process defined in claim 2 wherein said acetate is an acetate of a metal from Group IIa or the Periodic Table.

4. The process defined in claim 3 wherein said acetate is magnesium acetate, said carboxylic acid is acetic acid and said anhydride is acetic anhydride, said solid residue being free from transition metal.

5. A process for preparing an olefin-polymerization catalyst which comprises reacting at least one acetylacetonate of an element from Group IIa or Group IIIa of the Periodic Table with at least one acyl group of an aliphatic carboxylic acid or an aliphatic carboxylic anhydride, heating the reaction mixture thus obtained to a temperature of 70° to 100° C for a period of 10 to 30 hours, and eliminating excess acyl compound to form a solid residue finely dispersable or soluble in an inert anhydrous nonpolar organic solvent.

6. The process defined in claim 5 wherein said acyl group is acetyl.

7. A process for producing an olefin-polymerization catalyst comprising reacting at least one halogenide of an element of Group IVa or VI a of the Periodic Table with at least one acyl group from an aliphatic carboxylic acid or an aliphatic carboxylic anhydride, heating the reaction mixture thus obtained to a temperature of 70° to 100° C for a period of 10 to 30 hours, and eliminating excess acyl compound to produce a solid residue finely dispersable or soluble in an inert, anhydrous nonpolar organic solvent.

8. The process defined in claim 7 wherein said acyl group is acetyl.

9. A process for preparing an olefin-polymerization catalyst which comprises reacting at least one oxyhalogenide of an element from Group Va of the Periodic Table with at least one acyl group from an aliphatic carboxylic acid or an aliphatic carboxylic anhydride, heating the reaction mixture thus obtained to a temperature of 70° to 100° C for a period of 10 to 30 hours, and eliminating excess acyl compound to produce a solid residue finely dispersable or soluble in an inert, anhydrous nonpolar organic solvent.

10. The process defined in claim 9 wherein said acyl group is acetyl.

* * * * *